United States Patent [19]
Kato

[11] Patent Number: 6,054,986
[45] Date of Patent: Apr. 25, 2000

[54] METHOD FOR DISPLAYING FUNCTIONAL OBJECTS IN A VISUAL PROGRAM

[75] Inventor: Masato Kato, Tokyo, Japan

[73] Assignee: Yamatake-Honeywell Co., Ltd., Tokyo, Japan

[21] Appl. No.: 08/927,575

[22] Filed: Sep. 8, 1997

[30] Foreign Application Priority Data

Sep. 13, 1996 [JP] Japan .................................. 8-243137

[51] Int. Cl.$^7$ ...................................... G06F 3/14
[52] U.S. Cl. ..................... 345/348; 345/967; 345/970; 345/334; 700/83
[58] Field of Search ..................... 345/348, 349, 345/964, 965, 967, 970, 356, 339, 334, 335; 364/188; 395/701, 704, 710; 700/83; 717/1, 4, 10

[56] References Cited

U.S. PATENT DOCUMENTS

| | | | |
|---|---|---|---|
| 4,656,603 | 4/1987 | Dunn ........................................ | 345/348 |
| 5,301,301 | 4/1994 | Kodosky et al. .................... | 345/967 X |
| 5,576,946 | 11/1996 | Bender et al. ....................... | 364/188 X |
| 5,706,455 | 1/1998 | Benton et al. ........................... | 345/348 |
| 5,831,611 | 11/1998 | Kennedy et al. ....................... | 345/335 |
| 5,862,372 | 1/1999 | Morris et al. ........................... | 395/701 |

*Primary Examiner*—Raymond J. Bayerl
*Attorney, Agent, or Firm*—Blakely, Sokoloff, Taylor & Zafman

[57] ABSTRACT

A method for the display of functional objects in a visual program that graphically defines the flow of data between functional objects serving as functional components on the computer screen is so arranged that icons (views) of functional objects are made out/edited via a view edit section and these view data are stored in the internal memory, while on the other hand the functional objects included in the design data are displayed on a computer screen by the above view data at the time of visual programming. At this time, all functional objects of the same type may be displayed using the above view data, or else specific functional objects alone may be displayed using the above view data. Besides, the above view data are employed also in the case of displaying individual functional objects in the object bar on the computer screen.

9 Claims, 8 Drawing Sheets

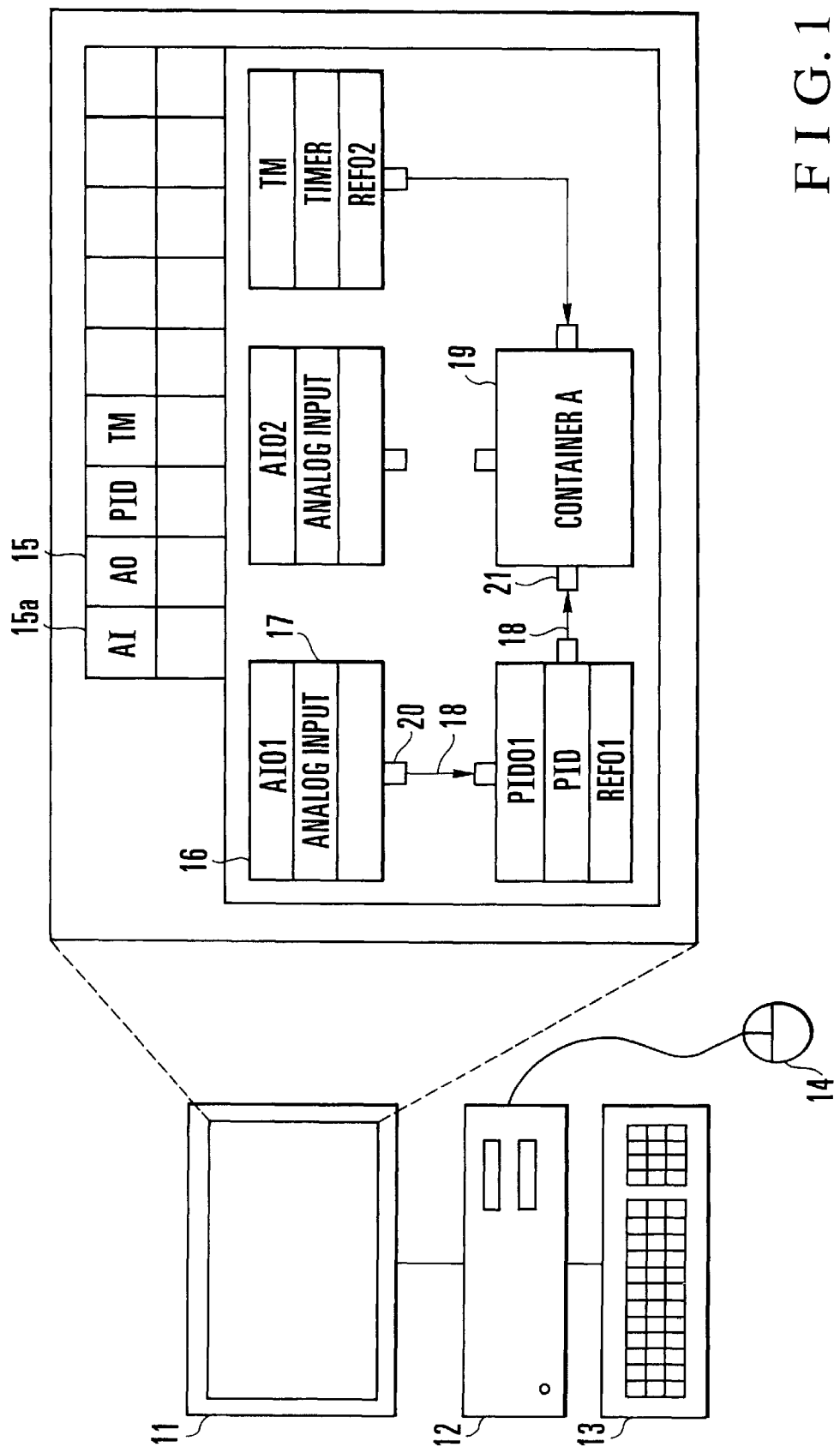
F I G. 1

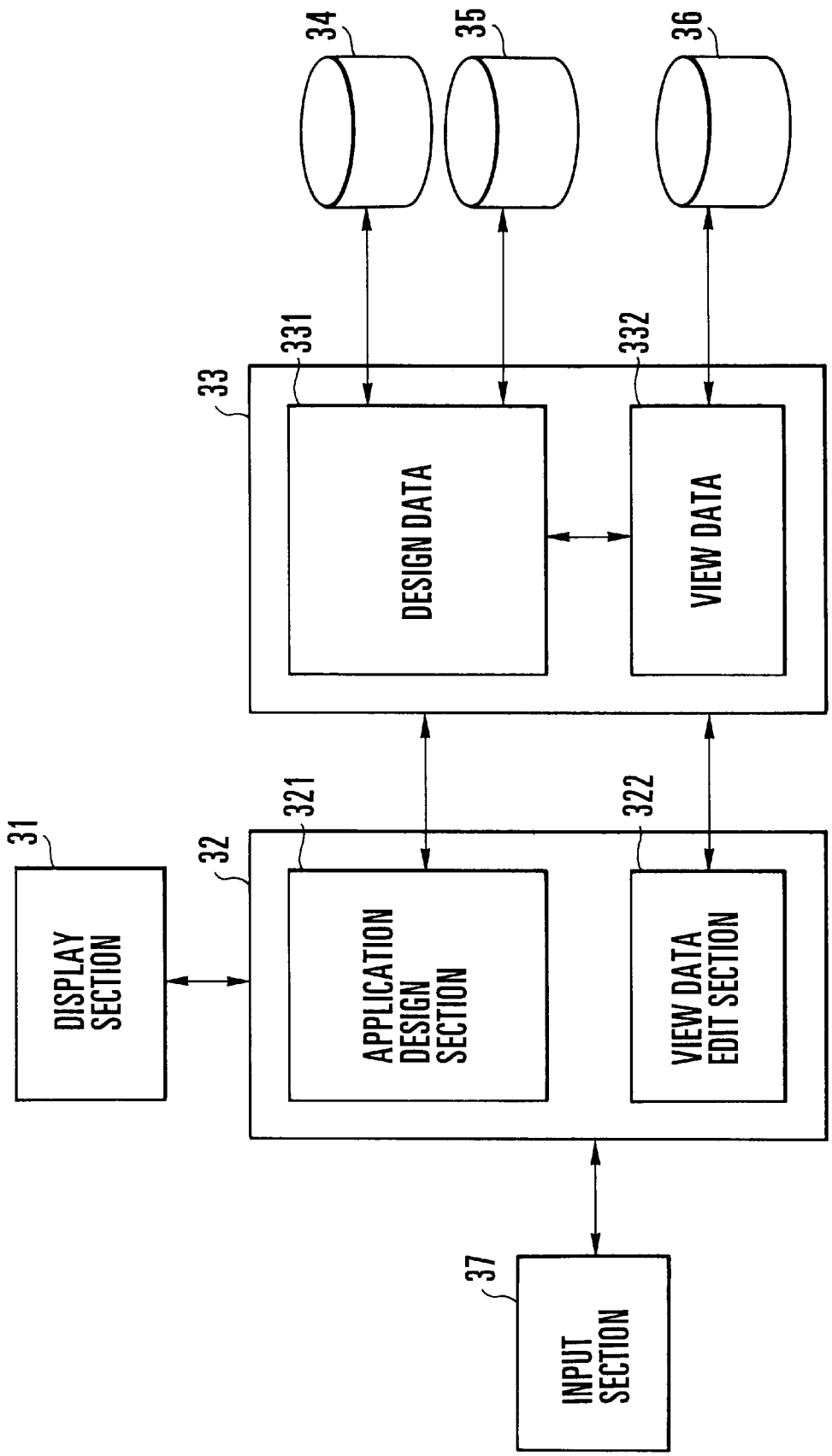
F I G. 2

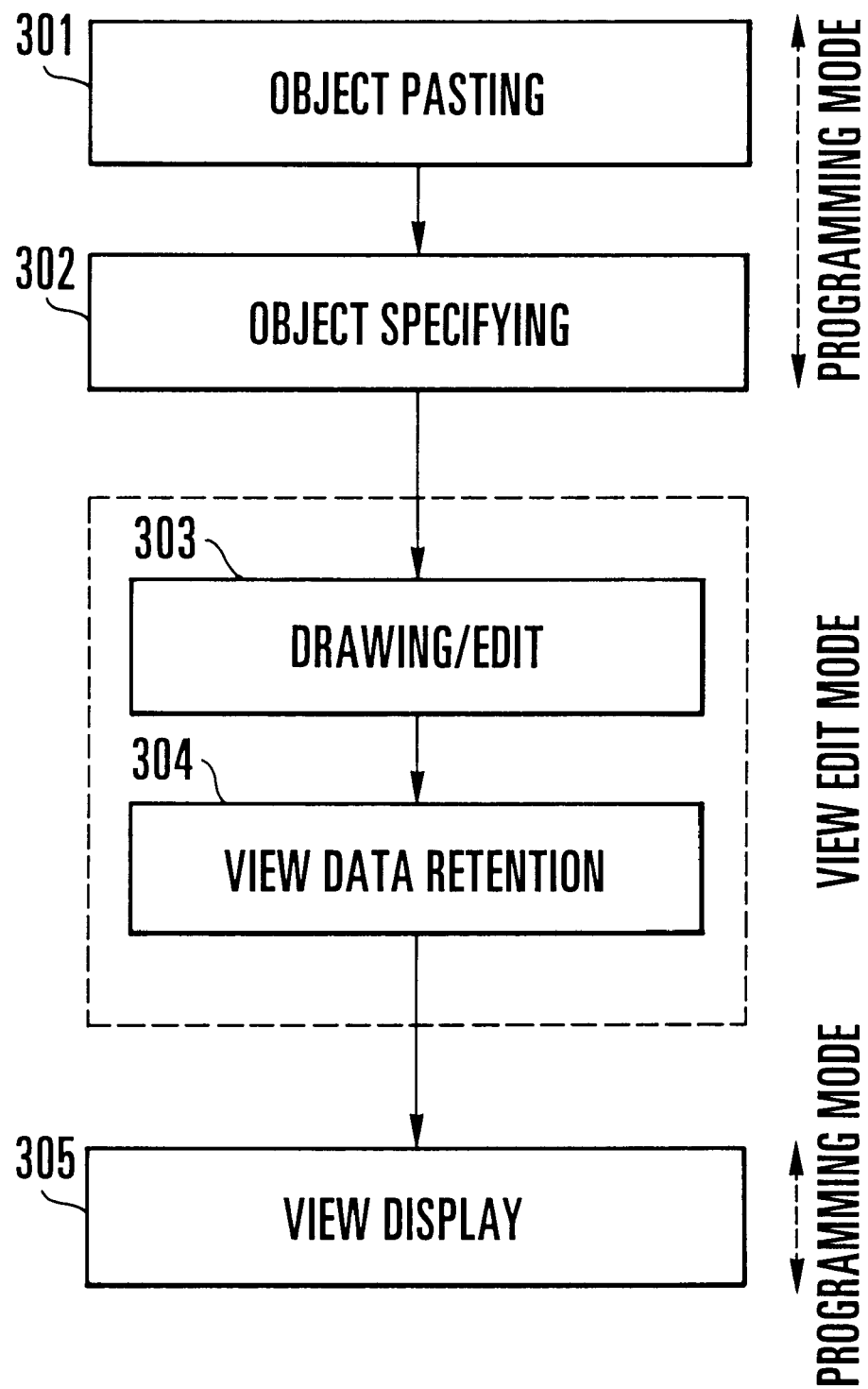
F I G. 3

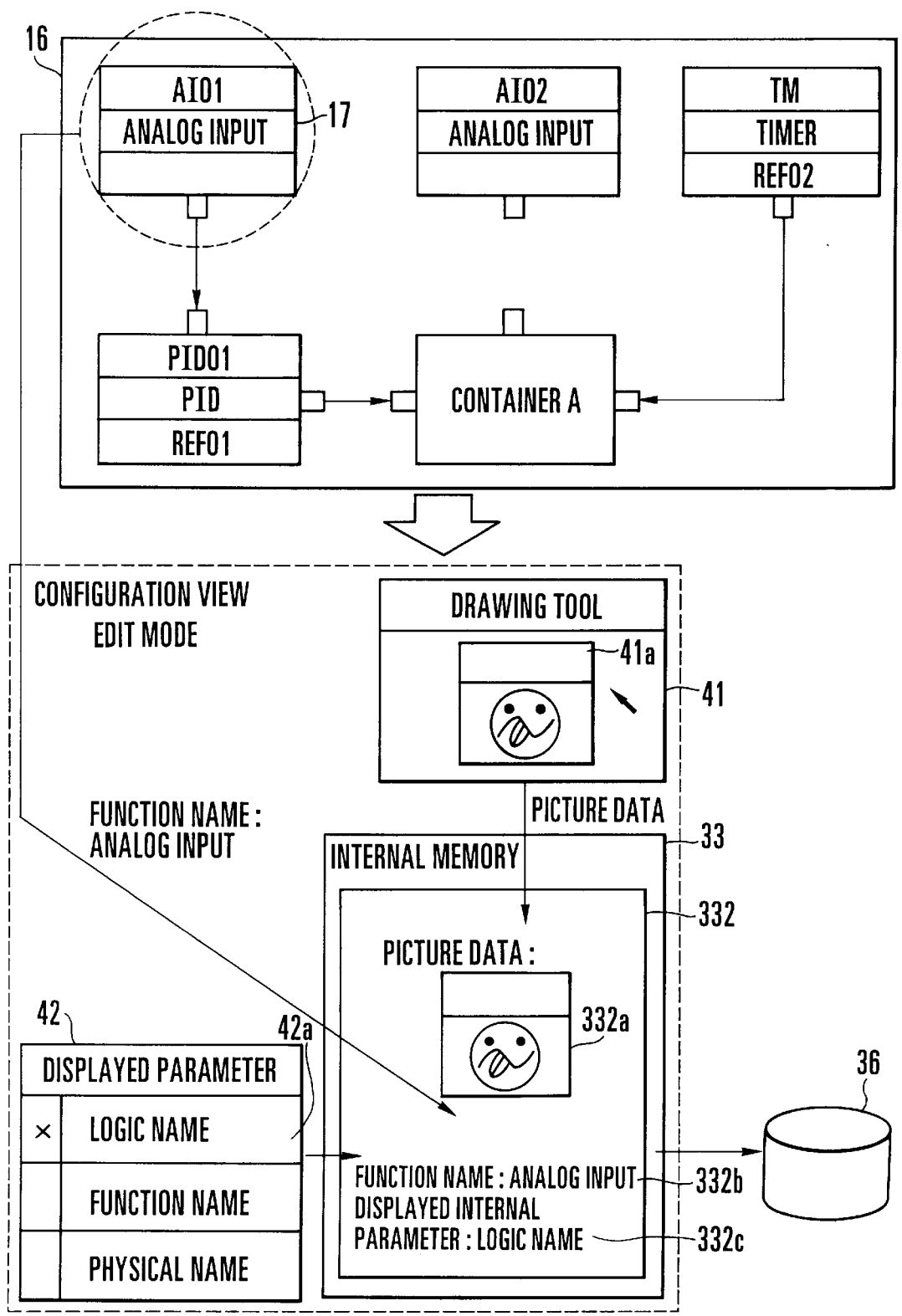
F I G. 4

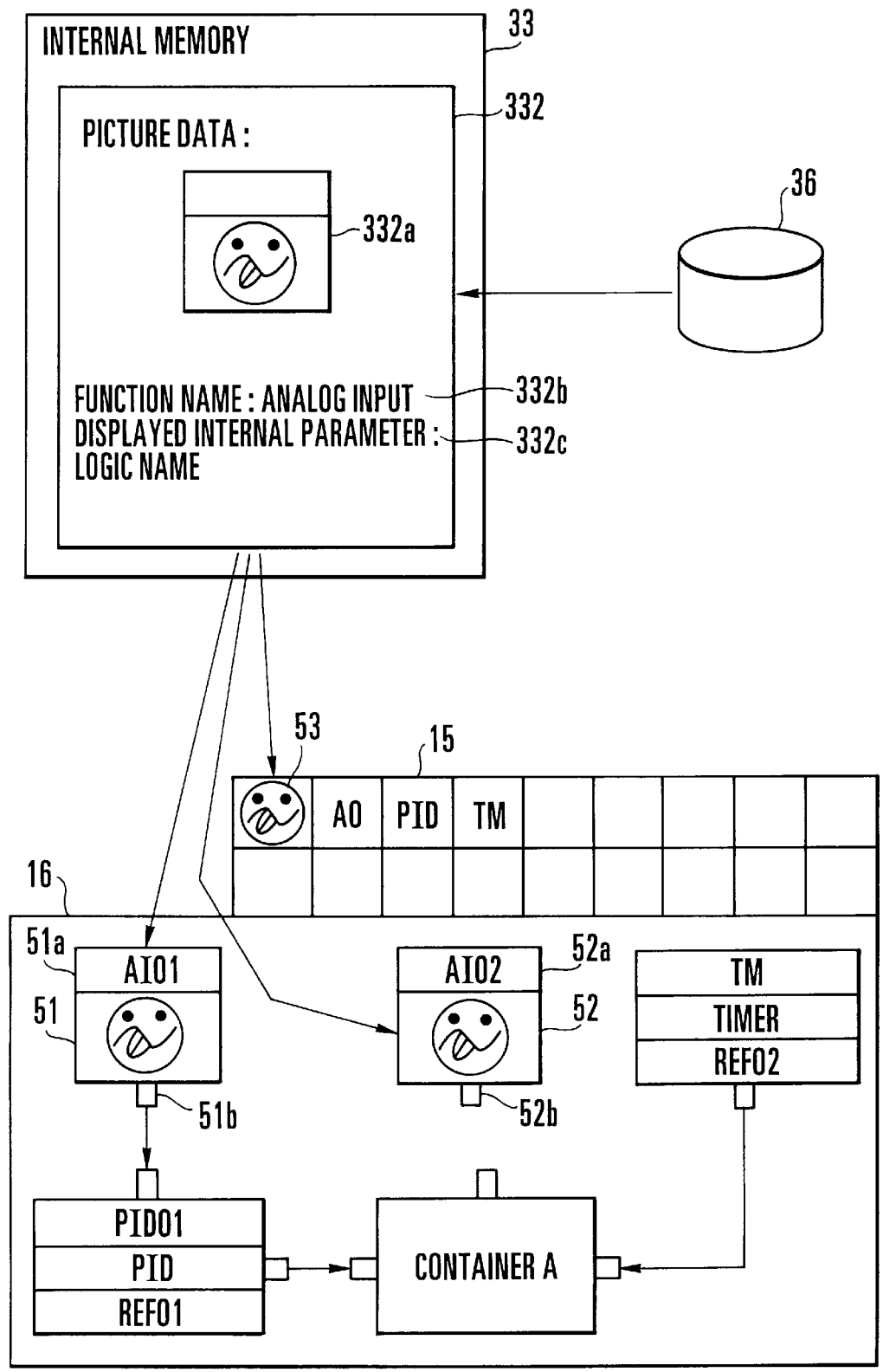
F I G. 5

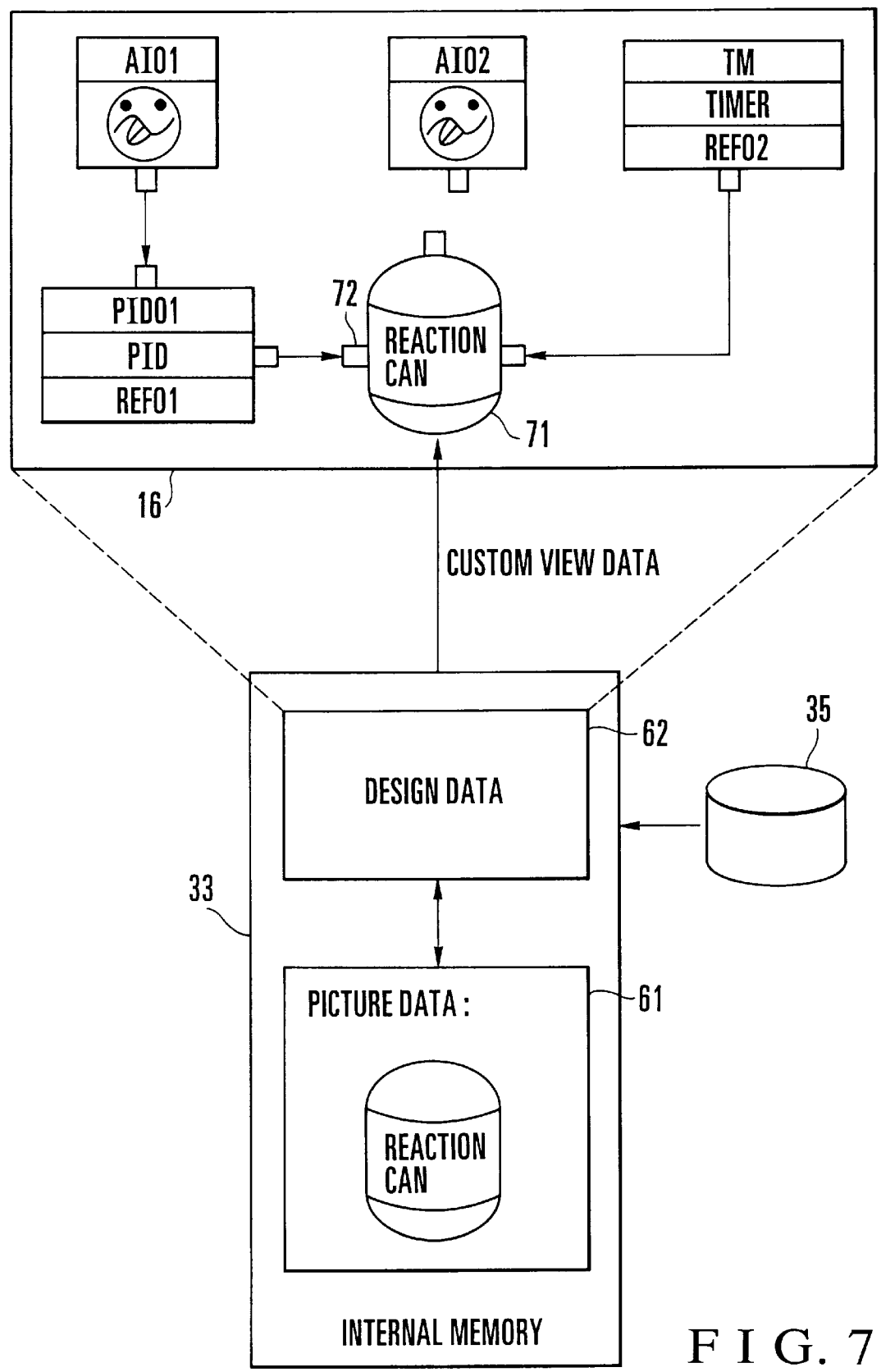
F I G. 7

METHOD FOR DISPLAYING FUNCTIONAL OBJECTS IN A VISUAL PROGRAM

BACKGROUND OF THE INVENTION

The present invention relates to a field of man-machine interface in engineering tools or the like and specifically to a method for displaying functional objects in a visual program that graphically defines the flow of data between functional objects operating as functional components on the computer screen.

The visual program is a technique for expressing graphically functional objects representative of specific functions and the flow of their data on a computer screen by using a block diagram to code a program from their connection relation. When a configuration tool for control design is taken as an example of an engineering tool using such a visual programming technique, basic function components (hereinafter, referred to as functional blocks) corresponding to input/output (I/O) points in a control system, control points such as PID component or the like are prepared as functional objects. These functional objects are objects including setup items corresponding to the relevant function, setup values given thereto and procedures for implementing the function. A user of such a functional block, i.e., a programmer of a program for control, displays an appropriate functional block in an application edit sheet on the computer screen and defines the relation between the block components while drawing a block diagram with lines called links.

FIG. 1 is a schematic showing the hardware configuration of the above-mentioned visual programming system and the computer screen in a visual program. The visual programming system is constructed on a personal computer (PS) or a work station (WS) comprising a display 11 serving as a display device, the main body 12 composed of a CPU, a storage and such others, and input devices such as a keyboard 13 and a mouse 14. Displayed on the display 11 are, in FIG. 1, an object bar 15 designating the list of individual available functional blocks with icons and an edit window 16 called application edit sheet for the design and development of an application program.

At the time of design and development of an application, a user selects any functional block from the object bar 15 by using the mouse 14 and displays it on the application edit sheet 16. For example, on clicking, dragging and dropping the "AI" 15a in the object bar 15 by using the mouse 14, a functional block 17 having a function of analog input is displayed on the application edit sheet 16. To display a functional block on the application edit sheet 16 in this manner is called "to paste".

Besides, a user can also call up a box called a container 19 to display (paste) it on the application edit sheet 16. Here, the container signifies to hold a subsystem which comprises a plurality of functional blocks and fulfills one function. Such a container is read out from a file (not shown in FIG. 1) onto the application edit sheet 16. The content of this container 19, i.e., a plurality of functional blocks constituent of the subsystem, can be also separately displayed on another application edit sheet (edit window). And, they can be also stored in a file. Thus, by holding a subsystem comprising a plurality of functional blocks in a container for handling, the hierarchical structure of objects to be designed can be expressed. Accordingly, unconscious of the individual functional blocks constituent of this subsystem, a user can handle the container 19 as one functional component. Hereinafter, such containers and functional blocks will be together referred to as functional objects.

After pasting functional objects onto the application edit sheet 16, a user connects the connecting terminals 20 of functional blocks 17 or the ports 21 of a container 19 through lines called links 18 by using the mouse 14 to graphically describe the flow of data between two functional objects. The application designed and developed in such a manner is stored as functional objects pasted onto the application edit sheet 16 and their connection relation. Besides, by following a procedure called implementation, a source code of the application can be created from the functional objects and their connection relation. That is, only by graphically defining the connection relation between functional blocks or containers on the application edit sheet 16, a user can create a source code of a program for control without consciousness of the program included in each functional object.

In a visual program, functional objects pasted onto an application edit sheet are displayed with icons. FIGS. 8A and 8B show one example of icon for a functional object. FIG. 8(a) is one example of icon for a functional block. In a rectangular icon 22, the internal parameters of a functional block are displayed.

The internal parameters displayed here are a logic name 22a representing the attribute of the relevant functional block, a function name 22b representing the function belonging to the relevant functional block and a physical name (tag name) 22c representing the point name for the identification of a specific function block in a specific application. Besides, an icon 22 is provided with a connection terminal 20 for connecting a link representing the connection relation with other functional blocks or the like.

On the other hand, as shown in FIG. 8(b), a container holding a plurality of functional block constituent a subsystem is displayed with a rectangular icon 23. This icon 23 is provided with a port 21 for connecting a link. The functional block group held via this port 21 in the container exchanges data with functional blocks outside the relevant container or with other containers. Hereinafter, icons of these functional objects pasted on an application edit sheet shall be referred to as views.

The general-use graphic representation (referred to as default view) of a functional object such as functional block or container in a conventional visual programming has generally been limited to a simplified one fundamentally expressed with a rectangle. As a result, all functional objects displayed on the display ended in assuming a similar outer appearance and a user in charge of the design and development of an application was compelled to read logic names and function names displayed here to identify individual functional objects pasted to the application edit sheet.

With such a representing method, however, letters representing function or the like tends to become small and difficult in reading when functional blocks or containers are complicated on a display or when a large program is made up, thus leading to a possibility that inappropriate functional objects might be connected by mistake.

Besides, in customers or markets of configuration tools for control design using a visual programming system, various representation shapes of functional objects are required. Especially for some customers or markets, there are cases where a widely recognized view is present. In such cases, it is desirable that a view meeting the request of customers can be provided. However, no conventional general-use representing method based on the default view could not meet such a requirement.

SUMMARY OF THE INVENTION

It is one purpose of the present invention to provide a representing method permitting a user to make up/edit any view, so that functional objects displayed on the computer screen are visually recognized easily and appropriately.

To attain the above-mentioned purpose, a display method for functional objects in a visual program according to the present invention, under a visual program environment where functional objects corresponding to specific functions are designated with an icon in the application edit sheet displayed on the computer screen and the above-mentioned icon are connected through links to define the connection relation between the functional objects, comprises on the above-mentioned application edit sheet a view edit procedure for making up/editing the icon of any specified functional object, a store procedure for storing the above icon made up/edited by the view edit procedure and a view display procedure for displaying the specified functional object at the time of visual programming by using the above-mentioned icon stored by the above-mentioned store procedure.

Here, the view edit procedure is to signify all procedures for making up and editing a view in the functional object specified by a user through the paste of a picture such as section line or polygonal line, character, bit map, etc. Accordingly, a visual programming system may be equipped with a dedicated drawing tool, but the make- up/edit of a view may be effected by using a general drawing tool such as CAD tool. View data such as picture made up/edited in such a manner are stored in a storage such as internal memory or file of a computer. And, on the basis of these stored view data, the display procedure displays the above functional object on an application edit sheet by using the view made up/edited in advance in place of a default view such as rectangle. Thus, a functional object can be designated with any view on the application edit sheet, thus facilitating the visual recognition of a functional object.

As a result, an erroneous connection or the like of a functional object is prevented which is apt to occur in a general-use graphic representation by conventional default views, resulting in the possibility of improving the productivity of a visual program and the reliability of an application. Besides, because a user can make up/edit any view for each functional object, the present invention can cope with the representation shape matching the request of customers or markets of a visual programming system or an application thereby.

In the present invention mentioned above, the specified functional view may be designated only with a picture made up/edited by the view edit procedure, but in this case, the internal parameters such as logic name and function name become impossible in expression on the default view. Thus, another display method according to the present invention is characterized in that especially the view edit procedure includes a step of specifying any internal parameter of the above-mentioned functional object and getting an internal parameter display portion provided as part of the icon and the view display procedure serves to display a value of the specified internal parameter mentioned above in the internal parameter display portion of the above-mentioned icon. That is, when pasting the internal parameters to be displayed (e.g., logic name or function name) and the display places thereof together with the picture data of newly made up/edited views as part of view data onto an application edit sheet, the logic name, function name or the like of the functional object are also so arranged as to be displayed. Thus, together with a visual recognition by the view, a user can carry out a visual program while referring to information about logic name, function name or the like of a functional object on the application edit sheet, thereby enabling erroneous connection to be reduced.

Besides, a third display method is characterized in that an object bar representing a list of available functional objects is displayed on the above computer screen and the list of the above functional objects in the object bar is displayed by using icons made up/edited in the above view edit procedure. Thus, an object bar recognizable for a user can be constructed. Thereby, it becomes possible to construct an object bar recognizable for a user and to improve the efficiency of a visual program.

Besides, a fourth display method is characterized in that the above view display procedure can move the input/output port of the above functional object for connecting a link to any position on the above icon made up/edited in the above view edit procedure. Thus, the position of an input/output port can be so set as to conform to a view and the connection relation with other functional objects via links can be made visually more recognizable.

A method for displaying functional objects in a visual program according to the present invention can also display only a specified specific functional object by using a view made up/edited in a view edit procedure, but a fifth method for displaying a functional object in a visual program according to the present invention displays not only the functional object specified in making up/editing a view but only automatically display a functional object of the same kind pasted on an application edit sheet by using that view. Thus, regardless of whether already pasted onto an application edit sheet or to be pasted in future, all functional objects with the internal parameter having a specific value by using the view made up/edited in a view edit procedure. Accordingly, a user need not to make one and the same drawing for a plurality of functional objects.

This can be implemented by relating a value of the internal parameter showing the kind of a specified functional object to the picture data forming a view to make a part of view data. To be concrete, by making a function name into a value of the internal parameter indicating the kind of a functional object, it is considered to relate a view with a specific function name. For example, when a specific functional block having a function name "analog input" is specified to make up/edit a view, by relating the picture data indicating the view to a function name "analog input" to make unified view data, other functional block already pasted onto an application edit sheet and having a function name "analog input" and a functional object having a function name "analog input" to be pasted in future can be displayed by means of this related view.

Besides, in a method for displaying functional objects in a visual program according to the present invention method, especially its storing procedure stores the information related to views made up/edited in the view edit procedure that is, the information related to picture data and (hereinafter, referred to as view data) into an internal memory, but it is also internal parameters and the like considered to store/retain these view data in an external storage such as hard disk or floppy disk. Here, a sixth invention is characterized in that especially the above store procedure can retain the data related to a view, made up/edited in the above view edit procedure, independently of the application serving as a subject of a visual program in the above application edit sheet. Thus, the view made up/edited once in a certain application can be reused in another application. Accordingly, a user need not make up a view anew for each application.

Furthermore, a seventh display method according to the present invention is characterized in that the above store procedure can retain the data related to an icon made up/edited in the above view edit procedure as a part of the application serving as a subject of a visual program in the above application edit sheet. By retaining the view information such as picture data as part of the application in such a manner, the unity of the view made up/edited in the view edit procedure with the application thereof is promoted. Accordingly, for functional objects such as container having the function closely connected to a certain application, a view considered to be the most suitable in the specific application can be united with the relevant application. Especially, when developing an application for a specific type of business, use of a view widely recognized in the relevant business world for a container having a peculiar function will enable the request of customers or markets to be met.

BRIEF DESCRIPTION OF THE DRAWINGS

FIG. 1 is a schematic showing the hardware configuration of a visual programming system and the display in a visual program;

FIG. 2 is a block diagram showing the configuration of a visual programming system according to embodiments of the present invention;

FIG. 3 is a flowchart showing the procedure of making up/editing the view of functional object;

FIG. 4 is a schematic illustrating the view edit procedure and store procedure in a first embodiment;

FIG. 5 is a schematic illustrating the view display procedure of a functional object in a first embodiment;

FIG. 7 is a schematic illustrating the view display procedure of a functional object in a second embodiment.

DESCRIPTION OF THE PREFERRED EMBODIMENTS

Figure 6:
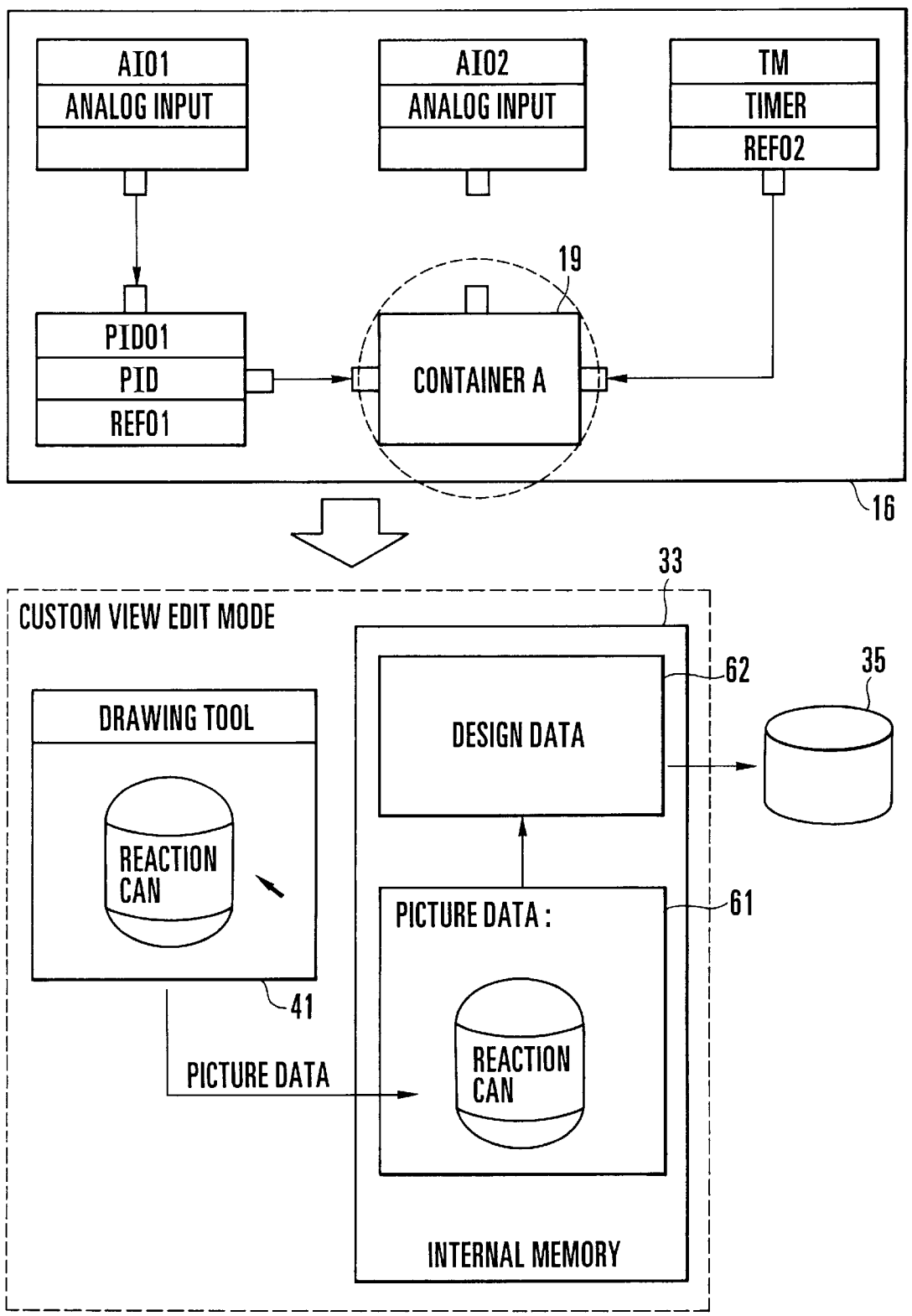
FIG. 6 is a schematic illustrating the view edit procedure and store procedure in a second embodiment.

Hereinafter, referring to the drawings, the present invention will be described in details.

Embodiment 1 is a visual programming system having two modes, i.e., a program mode to perform a visual programming and a view edit mode to perform a view make-out and edit of functional objects.

As shown in FIG. 1, the hardware configuration of such a visual programming system comprises a display 11, the main body 12 composed of CPU, storage and suchlike and input devices such as keyboard 12 and mouse 14. Incidentally, although not shown in FIG. 1, a storage medium such as photomagnetic disk in which a program for operating a visual programming system according to the present invention on the computer hardware is stored may be connected to the main body 12.

As shown in FIG. 2, this visual programming system broadly comprises a display section 31 corresponding to the display 11 of FIG. 1, a control section 32 for controlling the design and development of an application and the make-out/edit of a view, an internal memory 33 for storing an application or view data, external storages such as a functional object data base 34 in which a functional block, container or the like defined in advance is stored, an application data file 35 for storing/retaining an application and a configuration view file 36 for storing/retaining the view data stored in the internal memory 33 and an input section 37 including a mouse 14 and suchlike.

Here, the control section 32 comprises a CPU and the main storage and its function can be divided into two: an application design section 321 and a view edit section 322. The application design section 321 is relevant to the programming mode and controls a visual program in general such as pasting of a functional object to an application edit sheet (hereinafter, referred to as edit sheet) 16 displayed on the display section 31, setup of a link between these functional objects and further process called substantiation for creating a source code from a functional object whose input/output relation is defined. On the other hand, the view edit section 322 is relevant to the view edit mode and controls the view edit procedure in general such as make-out/edit of a view by means of drawing tool or specification of internal parameters.

When effecting the design/development of an application in such a visual programming system, the relation between the hardware resources such as internal memory 33 or external storages and the data is utilized as follows. That is, on pasting a functional object such as functional block and container onto an edit sheet 16 in the programming mode, the relevant functional object is read from the functional object data base 34 into the internal memory 33 as an application design data 331. As a result, each of these functional objects can be provided the only physical name in its application. For the functional object making an application design data 331 on the internal memory 33, a user defines a connection relation. A link showing this connection relation becomes also part of an application design data 331. The application design data 331 made up thus can be retained in an application data file 35. Besides, it is also possible to load the application design data stored once from the application data file 35 onto the internal memory 33 and to continue a visual program.

On the other hand, in the view edit mode, the make-out/edit of the view of a functional object is carried out under a view data edit section 322. Also here, the view data 332 made out/edited in the view make-out/edit procedure mentioned later are stored in the internal memory 33.

FIG. 3 shows the procedure in the make-out/edit of a view of an functional object. Prior to the make-out/edit of a view, a user pastes functional objects onto the edit sheet 16 as with conventional visual programming (step 301) in the programming mode and thereafter specifies one of these pasted functional objects as the object of view make-out (step 302). At this time, the functional object to be specified is independent of whether in the progress of design/development of an application or pasted onto an edit for the purpose of make-out/edit of a view from the first. After specifying any functional object, a drawing tool is automatically started up by selecting the "view edit" from the mode select menu (not shown) and the view edit mode sets in.

A user makes out/edits the view of the functional object specified above by using the drawing tool thereof (step 303). Besides, by starting the internal parameter setup tool, a user can set the internal parameters to be displayed in a newly made out/edited view and their display positions. This view data are automatically stored/retained in a file at the completion of the view edit procedure (step 304). These steps 303 and 304 correspond to the view edit mode. And, on returning to the programming mode, the functional object specified above is displayed by means of the view made out/edited in the view edit mode (step 305).

Referring to FIGS. 2 and 4, such procedure as mentioned above will be described in details.

Among the functional objects pasted onto the edit sheet 16, FIG. 4 shows the situation where the functional block 17 having the function name "analog input" is specified. On selecting the view edit mode among the mode select menu (not shown in FIGS. 2 and 4), the operation of the control section 32 passes from the application design section 321 to the view edit section 322, thereby entering the view edit mode.

When the operation enters the view edit mode from the programming mode, the view edit section 322 automatically starts the drawing tool 41. By employing this drawing tool 41, a user draws a picture such as square, ellipse and polygonal line or a character or makes the image taken in by a scanner or the like into bit map data, so that a user can make out and edit picture data. Picture data made up and edited thus are stored in the internal memory 33 as a new view for a functional object specified previously.

Figure 8B:
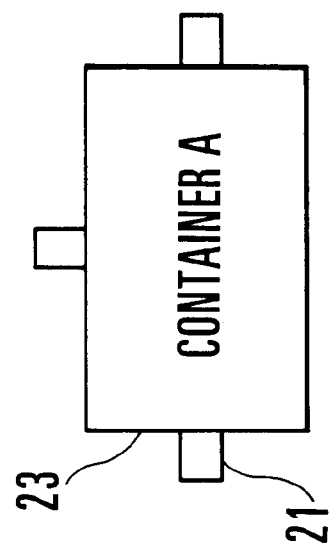
FIG. 8A and 8B are drawings showing examples of conventional icons of functional objects pasted onto an edit sheet.
Figure 8A:
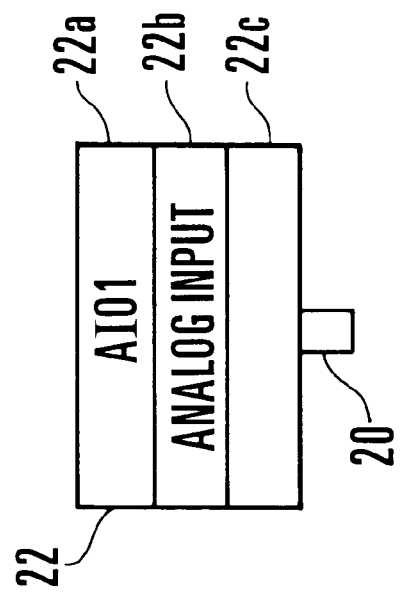

Besides, by starting an internal parameter setup tool 42, a user can set the internal parameter to be displayed in a newly made out/edited view and its display position. That is, when the specified functional object is a functional block having a plurality of internal parameters, it is considered to display a logic name, function name and physical name together with the default view displayed in FIG. 8 at the time of visual programming. Thus, the internal parameters with which to display are so arranged as capable of being specified by a user by using the internal parameter setup tool. Thereby, it becomes possible to display values of internal parameters together with a new view in the programming mode. For example, FIG. 4 shows that a "logic name" 42a is specified as the parameter to be displayed in the internal parameter setup tool 42. Besides, the drawing tool 41 shows that the display position 41a of the internal parameter is specified as part of picture data.

The information related to the above-mentioned internal parameter display is stored in the internal memory 32 together with the picture data as part of the view data 332. FIG. 4 shows that the picture data 332a and the display internal parameter "logic name" 332c are as part of view data 332 on the internal memory 33. Incidentally, the specification of this internal parameter is optional and a user may not always effect the specification by means of the internal parameter setup tool.

Furthermore, as shown in FIG. 4, the view data 332 includes the function name "analog input" of the specified functional object 17 as part thereof (332b). In the programming mode, by employing the function name of the specified functional object as a keyword as mentioned above, not only the functional object (e.g., functional block 17 of FIG. 4) specified in the transit to the view edit mode but also the functional objects of the same kind are displayed by means of the view made out/edited by a user.

If described referring to FIG. 4 from the standpoint of the make-out/edit procedure of view data, this becomes as follows. That is, when the operation enters the view edit mode after specifying the functional object (functional block) 17 to make out/edit a new view, the view edit section 322 automatically stores the function name "analog input" of its functional block 17 as a key word in the function name 332b of the internal memory 33. At this time, if the specified functional object is a container, the "container," function name 332b of view data 332 is stored in the function name 332b on the internal memory 33. The display procedure of functional object in the program mode where the function name 332b stored in the internal memory 33 is employed will be described below.

Incidentally, it is only one example to employ a function name for a keyword in the kind discrimination of a functional object as mentioned above. Accordingly, needless to say, by selecting a logic name (e.g., "A101" ) as a keyword in place of a function name, only a functional object having the same attribute can be also displayed by means of the view made out/edited previously.

The view data 332 made out/edited as mentioned above comprise picture data 332a serving as views of the specified functional objects and function names 332b indicating the kinds of functional objects and contain the information 332c related to the internal parameters to be displayed as optional. And, the view data 332 on the internal memory 33 are saved in a configuration view file 36 at the completion of the view edit mode.

When the make-out/edit and store of a view are completed like this, the operation automatically switches from the view edit mode to the programming mode and a user can effect visual programming by using a new view made out/edited just now. At this time, by specifying the same functional block to enter the view edit mode again, the view made out once can be modified. Besides, in this programming mode, it is also possible to specify a different functional block and to enter the view edit mode again. In this case, a user can make out/edit other view data anew according to a similar procedure.

In this embodiment, whereas an application is stored in a application data file 35, view data are retained as an independent file in a configuration view file 36. And, the new view data made out/edited from afterward in this application are saved in a configuration view file 36 common to one application in such a manner as to be added to the view data already made out/edited. The configuration view file 36 completed thus includes all view data to be used in this application, but becomes independent of the application itself. Thus, the view data retained in this configuration view file 36 can be utilized for a different application.

Next, the display procedure in Embodiment 1 will be described referring to FIG. 5.

The view data 332 made out/edited by the above- mentioned view edit procedure are stored on the internal memory 33. These view data 332 comprise picture data 332a, the function name 332b of a functional object acting as a key word and the internal parameter 332c to be displayed. In addition to those which have just been made out/edited in the view edit mode, such view data 332 may be those read in from a configuration view file 36. In the programming mode, the application design section 321 shown in FIG. 2, when the above-mentioned view data 332 are present on the internal memory 33, displays those corresponding to the view data 332 out of the functional objects on the edit sheet 16 by using picture data 332a.

In this embodiment, by using a value of internal parameter as a key word, a plurality of functional objects having a common property can be displayed on the basis of one view data set. Such a view is referred to here as configuration view. To be concrete, as shown in FIG. 5, since view data 332 contain the function name "analog input" 332b as a keyword, those having the same function name out of the functional objects pasted onto the edit sheet 16 are displayed by using picture data 332a independently of their pasted time (51, 52). Besides, also when functional objects having the same function name ("analog input" ) as with the keyword are pasted onto the edit sheet 16, they are displayed using the picture data 332a.

Incidentally, as a keyword, Embodiment 1 employs a function name as mentioned above, but may employ other internal parameters in place of this. That is, by employing a logic name, e.g., "A101", as a keyword in the view edit procedure, configuration view data can be also made out. In this case, taking FIG. 5 as an example in the programming mode, the functional object 51 having the logic name "A101" is displayed employing the picture data 332a, whereas a functional object 52 having a different logic name is displayed by means of the default view shown in FIG. 8(a).

Incidentally, in such a case, employed as an icon in the object bar 15 is the default.

On the other hand, in the configuration views 51 and 52, values of internal parameters specified by employing the internal parameter setup tool 42 (FIG. 4) in the previous view edit procedure, i.e., the logic names "A101" and "A102" of functional objects, are displayed at the specified positions (51a and 52a). Besides, the input/output ports 51b and 52b of the functional objects 51 and 52, represented by means of views made out by a user, can be displayed at any position around the new views.

In such a manner, by displaying the functional objects of specific kinds on the edit sheet 16 with the aid of the views made out/edited by a user, the view fit for the application under make-out can be also utilized and the visual recognition of a functional object in a visual program becomes easy.

Furthermore, also for the view 53 corresponding to the functional object "analog input" in the object bar 15, the picture data 332a of view data 332 are employed. Thus, the visual recondition is facilitated in selecting a functional object from the object bar 16.

Since such configuration view data are stored/retained in the configuration view file independently of the application, the configuration view made out once can be also utilized for other applications. Incidentally, in the above description, one set of view data 332 is to be stored in the internal memory 33, but needless to say, two sets or more of view data may be stored.

Next, Embodiment 2 of the present invention will be described referring to FIGS. 6 and 7.

Embodiment 2 is characterized in that, in addition to a configuration view described in Embodiment 1, a view called custom view can be utilized. Here, the custom view means a view employed only for the specified functional object itself. This differs in a view peculiar to the specified functional object itself from the configuration views usable for a plurality of functional objects common in property via a keyword. Such a custom view is meaningful especially in the case of employing a container having the function peculiar to its application.

The make-out/edit of a custom view is basically carried out according to the procedure shown in FIG. 3. That is, first in view of specifying the functional object (e.g., container A19 of FIG. 6) pasted onto the edit sheet 16 in the programming mode to enter the view edit mode, it is common to that of Embodiment 1. With Embodiment 2, however, in entering a view edit mode, a user must select either of two view edit modes, i.e., custom view edit mode or configuration view edit mode. Here, the description will proceed assuming that the custom view edit mode is selected.

Here, when the custom view edit mode is selected, the drawing tool 41 is automatically started as with Embodiment 1. It is similar to those described in Embodiment 1 that a user can draw a picture such as square, ellipse and polygonal line or a character by employing this drawing tool 41 or can deal with the image taken in by a scanner or the like as bit map data to thus make out and edit picture data. Since a custom view becomes a view peculiar to the functional object specified previously, the custom view data 61 stored in the internal memory 33 in the custom view edit mode are satisfied with picture data alone as shown in FIG. 6.

At this time, these custom view data 61 is regarded as part of the specified functional object among the application design data 62 stored in the internal memory 33. This is implemented by the functional object having a pointer to indicate a custom view data to its object data. And, at the time of retaining the application design data 62 into an application data file 35, these custom view data 61 are retained as part of this specific application. Different in this point are they from configuration views stored/retained in a configuration view file 36 independently of the application (FIGS. 2 and 4).

Incidentally, it is also possible to select the configuration view edit mode rather than the custom view edit mode. Even in this case, the drawing tool 41 is automatically started also and the following configuration view edit procedure is the same as with Embodiment 1.

Next, the display procedure of a custom view according to the embodiment will be described referring to FIG. 7.

When a custom view is made out/edited as mentioned above, or when the application including the custom view data is loaded from the application data file 35, the custom view data 61 are stored in the internal memory 33 in addition to the application design data 62. When the functional object pasted onto the edit sheet 16 has custom view data, the application design section 321 (FIG. 2) in a visual programming system automatically uses the custom view data (picture data) 61 included in the internal memory 33 to display this object by means of a custom view 71. Here, by specifying the functional object displayed by means of a custom view 71 to transit to the custom view edit mode again, it is also possible to modify or remake the existing custom view 71.

Incidentally, in Embodiment 2, since two types of views, custom view and configuration view, are available, the following 2 types of view display modes are provided for the display procedure, a user can arbitrarily select either one of them from the view display menu.

First, a first view display mode is referred to as custom view display mode and if a custom view is defined by the above-mentioned view edit procedure, a functional object is displayed using it. If not, a functional object is displayed by means of a configuration view if the configuration view is defined or otherwise it is displayed by means of the default view.

On the other hand, a second view display mode is referred to as configuration view display mode. Here, regardless of whether the presence or absence of a custom view, the display of those whose configuration views are defined are performed by means of their own configuration views or that of others are by means of the default view. Accordingly, by selecting the configuration view display mode, a user can forbid the display by means of a custom view.

As mentioned above, in the custom view edit mode, a user can make out/edit view(s) peculiar to functional object(s), in particular to container(s) having a specific function, and suitable for an application in the application under design. Besides, also in the custom view edit mode, the input/output port 72 can be moved to any position of a view. In the custom view display mode, since only the specified functional object(s) is (are) displayed by means of its (their)

peculiar view(s) on the view edit sheet, a user can lightly distinguish it (them) from the other functional objects and simultaneously visually its (their) function(s) at the time of visual programming.

Incidentally, in Embodiments 1 and 2, the example of employing a configuration view for a functional block and a custom view for a container is described respectively, but needles to say, by contraries, it is also possible to employ a custom view for a functional block and a configuration view for a container.

What is claimed is:

1. A method for the display of functional objects in a visual program, under a visual programming environment where functional objects corresponding to specific functions are designated with an icon on the application edit sheet displayed on the computer screen and said icon is connected through links to define the connection relation between said functional objects, comprising:

a view edit procedure for making up/editing the icon of functional objects including figure data and internal parameters, and for providing an internal parameter display portion for optional display in place of said icon, designating at least one or more parameters from among said internal parameters;

a store procedure for storing said icon made up/edited by said view edit procedure; and a view display procedure for displaying said specified functional object on said application edit sheet at the time of visual programming by using said icon for displaying an internal parameter value stored by said store procedure in said internal parameter display portion.

2. A method for the display of functional objects in a visual program as set forth in claim 1, wherein an object bar representing a list of available functional objects is displayed on said computer screen and the list of said functional objects in said object bar is displayed by using icons made up/edited in said view edit procedure.

3. A method for the display of functional objects in a visual program as set forth in claim 1, wherein said view display procedure can move the input/output port of said functional object for connecting a link to any position on said icon made up/edited in said view edit procedure.

4. A method for the display of functional objects in a visual program as set forth in claim 1, wherein at the time of displaying a functional object of the same type as with said specified functional object on said application edit sheet, the icon made out/edited by said view edit procedure is automatically employed by said view display procedure.

5. A method for the display of functional objects in a visual program as set forth in claim 1, wherein the data related to icons made out/edited in said view edit procedure can be retained on said application edit sheet, independently of the application serving as a subject of a visual program.

6. A method for the display of functional objects in a visual program as set forth in claim 1, wherein the data related to icons made out/edited in said view edit procedure can be retained as a part of the application serving as a subject of a visual program in said application edit sheet.

7. A method for the display of functional objects in a visual program as set forth in claim 1, wherein said view edit procedure can move the input/output port of said functional objects for connecting a link to any position on said icon displayed by using figure data made up/edited in said view edit procedure.

8. A method for the display of functional objects in a visual program as set forth in claim 1, comprising:

a custom view edit procedure for changing a view of designated functional objects;

a storage procedure for storing said icon made/edited by said custom view edit procedure; and a custom view display procedure for displaying on said application edit sheet by using said icon stored by said storage procedure in a visual program.

9. A method for the display of functional objects in a visual program according to claim 8, in the custom view display procedure for displaying on an application edit sheet in a visual program, comprising:

selecting a custom view display mode for displaying a custom view also, if said custom view is defined on said application edit sheet; and selecting a configuration view display mode not displaying said custom view.

* * * * *